(12) United States Patent
Mohammed et al.

(10) Patent No.: US 10,536,727 B2
(45) Date of Patent: Jan. 14, 2020

(54) OVER-THE-TOP MULTICAST SERVICES

(71) Applicant: Verizon Patent and Licensing Inc., Arlington, VA (US)

(72) Inventors: Mansoor Ali Shah Mohammed, Plano, TX (US); Arvind Basra, Glen Ridge, NJ (US); Cesar Brea, Branchburg, NJ (US); Glenna Colaprete Hudson, Henrietta, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 214 days.

(21) Appl. No.: 15/670,373

(22) Filed: Aug. 7, 2017

(65) Prior Publication Data

US 2019/0045231 A1   Feb. 7, 2019

(51) Int. Cl.
*H04N 21/23* (2011.01)
*H04L 29/06* (2006.01)
*H04N 21/2385* (2011.01)
*H04N 21/472* (2011.01)
*H04N 21/2662* (2011.01)

(52) U.S. Cl.
CPC ......... *H04N 21/23* (2013.01); *H04L 65/4076* (2013.01); *H04N 21/2385* (2013.01); *H04N 21/472* (2013.01); *H04N 21/2662* (2013.01)

(58) Field of Classification Search
CPC .. H04N 21/23; H04N 21/472; H04N 21/2385; H04N 21/2393; H04N 21/2402; H04N 21/2662; H04N 21/26216; H04N 21/26225; H04L 65/80; H04L 65/4706
See application file for complete search history.

(56) References Cited

U.S. PATENT DOCUMENTS

| | | | |
|---|---|---|---|
| 8,806,522 B2 * | 8/2014 | Chen | H04N 21/2668 725/23 |
| 2007/0112575 A1 * | 5/2007 | Savoor | G06Q 10/06375 705/7.34 |
| 2009/0217326 A1 * | 8/2009 | Hasek | H04N 7/17336 725/87 |
| 2013/0125175 A1 * | 5/2013 | Hao | H04N 21/47202 725/62 |
| 2015/0049762 A1 * | 2/2015 | Mantin | H04L 65/4076 370/390 |
| 2016/0150421 A1 * | 5/2016 | Li | H04W 24/02 370/235 |

* cited by examiner

*Primary Examiner* — John M MacIlwinen

(57) ABSTRACT

A method, a device, and a non-transitory storage medium are provided to receive network resource information pertaining to a network, and generate timeslot information pertaining to a network based on the network resource information. The timeslot information may indicate a date, a time period, a geographic service area, and quality of service parameters in which the network resource is available for use by subscribers of a multicast service to deliver programs. The timeslot information and cost information are published, and the OTT multicast service provisions the delivery of programs using timeslots secured by the subscribers.

20 Claims, 13 Drawing Sheets

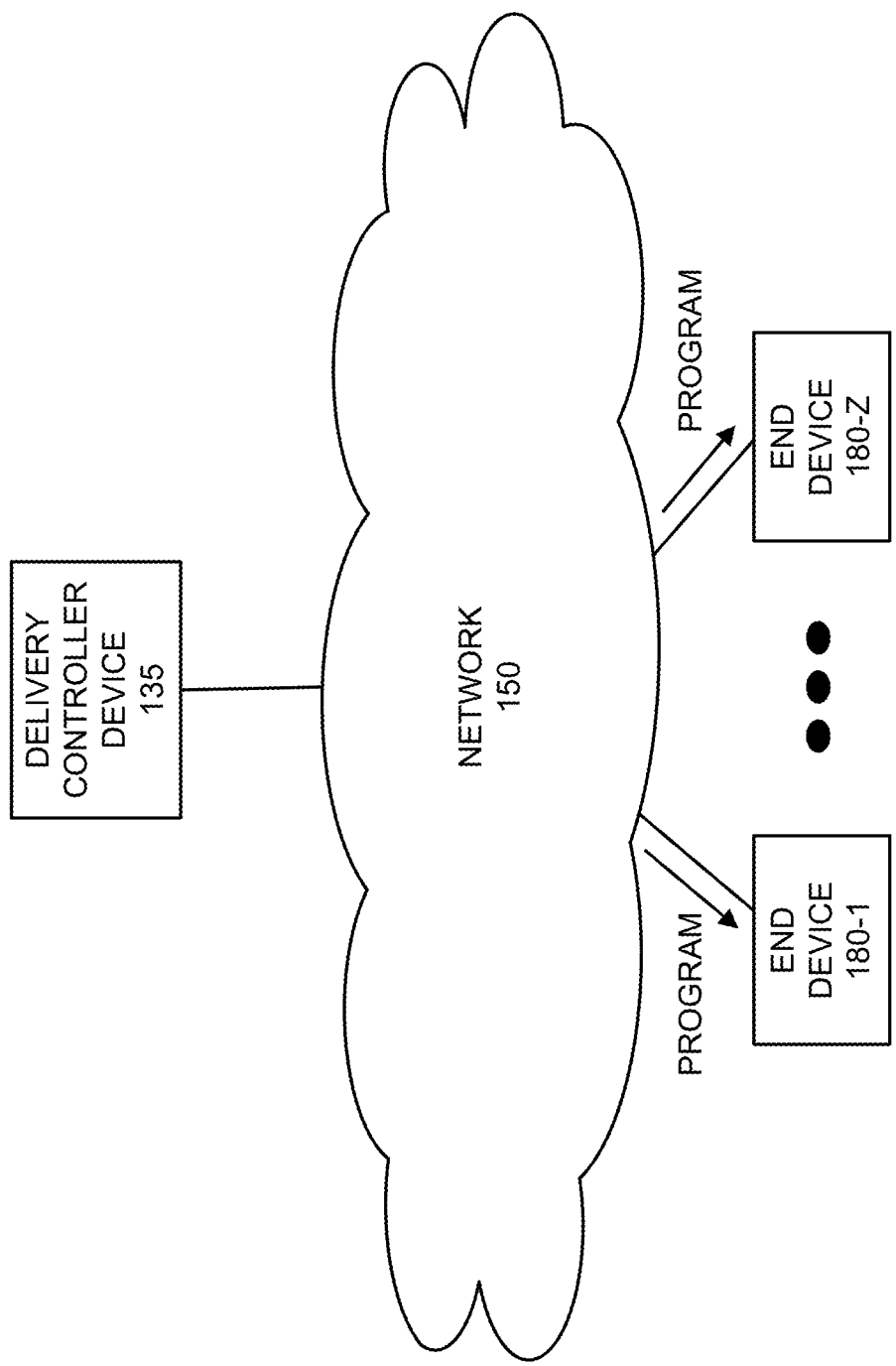

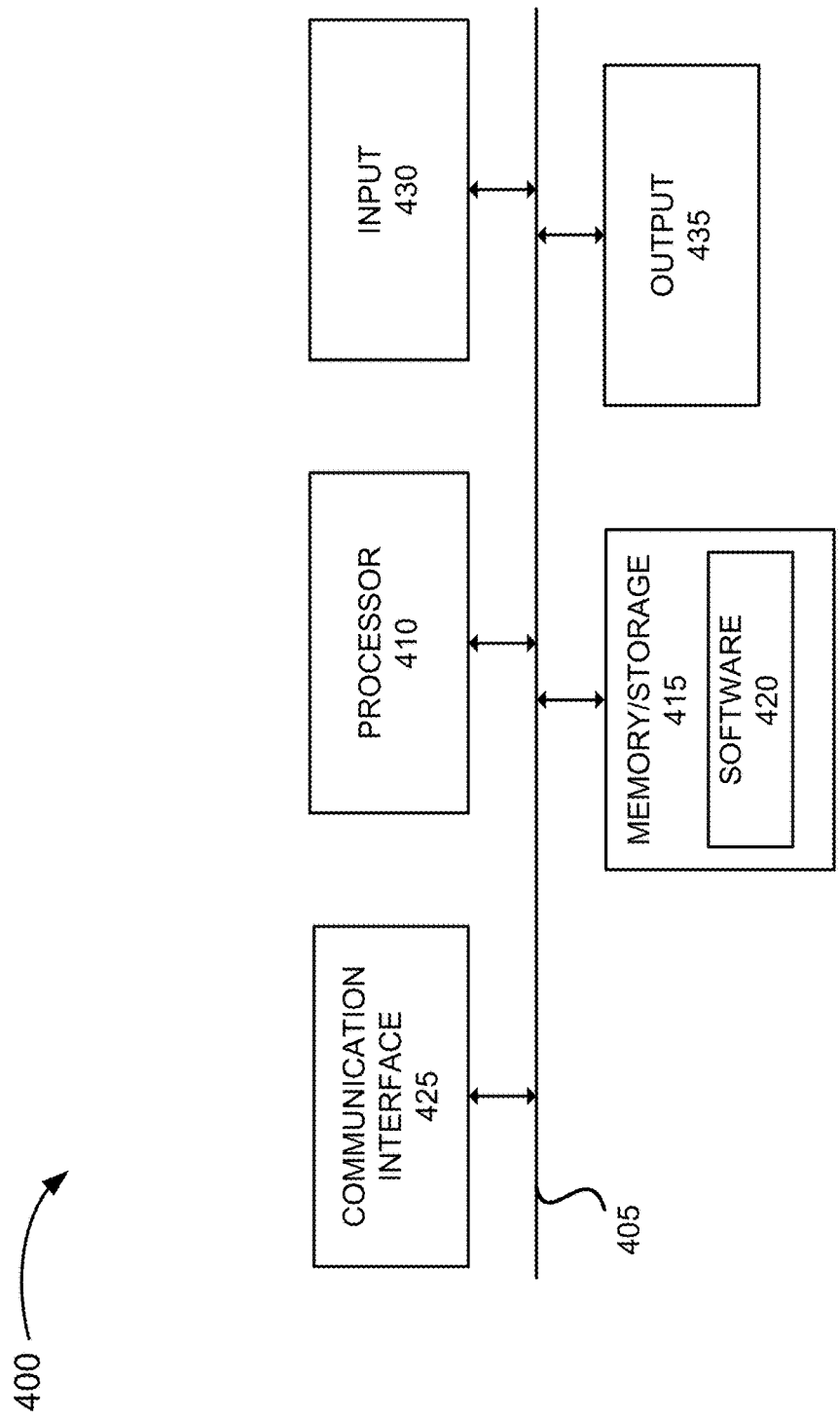

OVER-THE-TOP MULTICAST SERVICES

BACKGROUND

Network operators, service providers, content providers, and other entities coordinate their efforts to allow for the delivery of various programs to end users. The end users may receive the various programs via a network delivery system.

BRIEF DESCRIPTION OF THE DRAWINGS

FIGS. 2A-2G are diagrams illustrating an exemplary process of the OTT multicast service;

FIG. 4 is a diagram illustrating exemplary components of a device that may correspond to one or more of the devices illustrated herein.

DETAILED DESCRIPTION OF PREFERRED EMBODIMENTS

Figure 1:
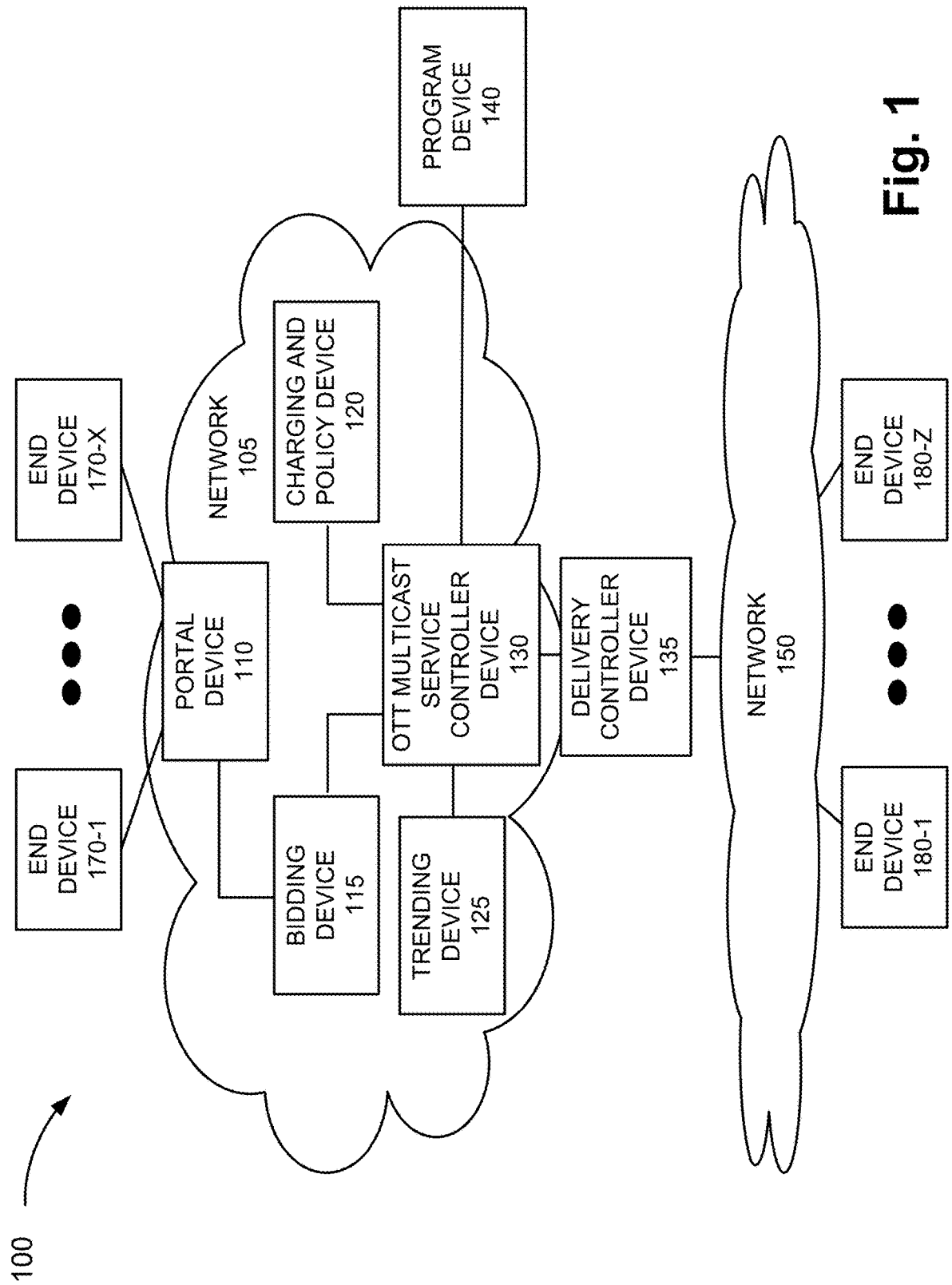
FIG. 1 is a diagram illustrating an exemplary environment in which an exemplary embodiment of an over-the-top (OTT) multicast service may be implemented.

The following detailed description refers to the accompanying drawings. The same reference numbers in different drawings may identify the same or similar elements. Also, the following detailed description does not limit the invention.

Currently, a content provider may secure network resources to delivery content based on a subscription in which network resources may be allocated or provisioned regardless of their use by the content provider. This framework may result in waste from both the network operator perspective and the content provider prospective. For example, some network resources may be unused or partially used, and network resources that may be allocated and fully used toward the delivery of programs may be strained due to the limitations of available network resources.

According to exemplary embodiments, an OTT multicast service is described. According to an exemplary embodiment, the OTT multicast service permits users to compete and secure timeslots for delivery of programs to end users and/or end devices for consumption. According to an exemplary embodiment, the OTT multicast service generates timeslot information based on network resource information. For example, the timeslot information may include a date and a time period associated with an available timeslot, a geographic service area to which the timeslot is directed, and a delivery parameter pertaining to a delivery of a program during the timeslot. For example, the OTT multicast service may generate multiple and different timeslot configurations pertaining to a same network resource, time period, and/or geographical service area. For example, the OTT multicast service may divide a three (3) hour time block of a network resource based on a one hour time block, a thirty minute time block, a fifteen minute time block, and/or other period of time, each of which may have the same or different delivery parameters (e.g., throughput, etc.). The OTT multicast service may also generate the timeslot information based on trending data, as described herein. The OTT multicast service further generates a cost to secure the timeslot information based on a policy-based billing architecture and the timeslot information.

According to an exemplary embodiment, the OTT multicast service may publish the timeslot and cost information to users of the OTT multicast service. The users may secure timeslot based on their requests. According to an exemplary embodiment, the users may provide the OTT multicast service with the programs to be delivered during the secured timeslots. For example, the users may provide uniform resource identifiers (URIs) that indicate the location of the programs. According to an exemplary embodiment, the OTT multicast service configures the delivery of programs based on the timeslot information and the program information. For example, the OTT multicast service may use preprovisioned or dynamically create network resources (e.g., bearers, servers, etc.) that support the delivery of the programs during the secured timeslots.

As a result, the allocation and use of network resources may be more efficient than conventional frameworks. The OTT multicast service may calculate multiple and different timeslot information relating to a network resource associated with a time period that allows users to secure a timeslot configuration that best aligns with their needs, and correspondingly may minimize waste of network resources in the form of unused and/or under-used bandwidth and/or other network resource. Additionally, the OTT multicast service may provide real-time or near real-time turn-around time from a time a timeslot is secured to a time the program is delivered. In this way, the potential for network resources to remain unused may be minimized. Additionally, the OTT multicast service may allow users to target certain geographic service areas with programs based on timeslot configurations that minimize waste from the users' and the network providers' perspectives.

The OTT multicast service may be directed to program providers or other entities that already have a subscription for program delivery. That is, the network resource provisioned under the OTT multicast service may be a network resource that is over and above the network resources that the user is entitled to under the terms of their other subscription. Additionally, the OTT multicast service may not be available to end users (e.g., consumers) that receive a multicast of a program configured by the OTT multicast service.

FIG. 1 is a diagram illustrating an exemplary environment 100 in which an exemplary embodiment of an OTT multicast service may be implemented. As illustrated, environment 100 includes a network 105, a network 150, end devices 170-1 through 170-X (also referred to collectively as end devices 170 and, individually or generally as end device 170), and end devices 180-1 through 180-Z (also referred to collectively as end devices 180 and, individually or generally as end device 180). As further illustrated, network 105 includes a portal device 110, a bidding device 115, a charging and policy device 120, a trending device 125, an OTT multicast service controller device 130, and a delivery controller device 135. Environment 100 also includes a program device 140.

Environment 100 includes communication links between the networks and between the devices. Environment 100 may be implemented to include wired (e.g., electrical, optical, etc.) and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A network device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device). The number of network devices, the number of end devices, the number of networks, and the arrangement in environment 100 are exemplary. For example, according to other embodiments, environment 100 may include additional network devices, fewer network devices, and/or differently arranged network devices, than those illustrated in FIG. 1. By way of further example, a single device in FIG. 1 may be implemented as multiple devices and/or multiple devices may be implemented as a single device. Also, according to other embodiments, one or more functions and/or processes described as being performed by a particular network device may be performed by a different network device, or some combination of network devices. Additionally, or alternatively, environment 100 may include additional networks, fewer networks, and/or differently arranged networks, than those illustrated in FIG. 1.

Network 105 includes one or multiple networks of one or multiple types that provide access to and use of the OTT multicast service. Network 105 may be implemented to include a service or an application-layer network, the Internet, the World Wide Web, an Internet Protocol Multimedia Subsystem (IMS) network, a Rich Communication Service (RCS) network, a cloud network, a packet-switched network, a private network, a public network, a computer network, a software-defined network, an IP network, a wide area network (WAN), a metropolitan area network (MAN), a service provider network, or some combination thereof.

Portal device 110 may include logic that provides access to the OTT multicast service. For example, portal device 110 may include logic that provides an authentication and authorization service in which users (e.g., program providers) are authenticated and authorized to access and use the OTT multicast service. Portal device 110 may provide a user interface that allows the program providers to enter authentication data (e.g., credentials, passwords, usernames, etc.). Portal device 110 may determine whether the authentication data is valid based on subscription data associated with an account. For example, portal device 110 may include logic that provides a registration process for new users. During the registration process, a program provider or other user may create the account before using the OTT multicast service. When portal device 110 determines that the authentication data is valid, the program provider may use the OTT multicast service. For example, the program provider may gain access to bidding device 115. When portal device 110 determines that the authentication data is not valid, the program provider may not use the OTT multicast service. Portal device 110 may provide a user interface that allows the program providers access and use of the OTT multicast service subsequent to successful authentication. Portal device 110 may also include logic that supports various communication mechanisms (e.g., encryption, secure connection, etc.).

Bidding device 115 may include logic that indicates available timeslots for the program providers to secure for use for delivery of programs. Bidding device 115 may provide a user interface that presents timeslot information and cost information pertaining to the available timeslots. For example, the timeslot information may include a date, a time period, and delivery parameters pertaining to a timeslot. The delivery parameters may indicate, for example, a locale or service area associated with the timeslot within which a program is to be delivered, a throughput associated with the timeslot, and/or other quality of service (QoS) parameters (e.g., priority, packet loss, packet delay, etc.). The delivery parameters may further indicate network resources associated with the timeslot and locale. The cost information may indicate a monetary amount for use of the available timeslot. According to various exemplary implementations, the cost information may be fixed or not.

Bidding device 115 may include logic that determines when an available timeslot has been secured by the program provider based on input received via the user interface. For example, the program provider may be presented with the timeslot and cost information, and the user interface may allow the program provider to acquire the timeslot for use based on input via the user interface. The user interface may allow multiple program providers to compete for the available timeslot. According to various exemplary implementations, bidding device 115 may determine which program provider secures the available timeslot based on a first-come first-served basis, an expiration of a time period that the available timeslot is published, and/or based on the cost information associated with the program provider. Bidding device 115 or portal device 110 may transmit information to a billing system so that the program provider is invoiced for the use of the secured timeslot. For example, the information may include account information pertaining to the program provider and the OTT multicast service, as well as the cost information associated with the secured timeslot. Bidding device 115 or portal device 110 may also transmit information to network devices associated with the program providers. For example, portal device 110 or bidding device 115 may transmit timeslot information to a network device (e.g., program device 140, a server device, or other device etc.) associated with the program provider that has secured the timeslot so that the delivery process of a program during the secured timeslot may take place.

Bidding device 115 may include logic that receives information (e.g., timeslot information and cost information) pertaining to the available timeslots from OTT multicast service controller device 130. In response to receiving the information, bidding device 115 may publish the available timeslots via the user interface. In this way, users of the OTT multicast service may consider and if desired, secure a timeslot for use. Additionally, in response to the user securing the timeslot, bidding device 115 may include logic that transmits information, which indicates that the timeslot has been acquired by the user, to OTT multicast service controller device 130.

Charging and policy device 120 may include logic that generates cost information based on timeslot information pertaining to available timeslots. Charging and policy device 120 may store and use policies that govern the calculation of cost information based on the timeslot information. For example, the policies may assign a particular cost to a timeslot based on the date and time period. For example, the date and/or the day may indicate a non-weekend day (e.g., Monday, Tuesday, etc.), a weekend day (e.g., Saturday, Sunday), a holiday (e.g., July $4^{th}$, Christmas, etc.), and so forth. Additionally, the time period may indicate when during the day the timeslot occurs and the corresponding length of the time period (e.g., 12 pm-1 pm, 3 am-3:15 am, etc.). Additionally, for example, the policies may assign a particular cost to a timeslot based on the delivery parameters. For example, the locale or service area may have a particular size (e.g., national, regional, city, town, etc.), population density, and other characteristics or demographics pertaining to the end users and/or the locale or service area. The locale or service area may also be associated with a trending parameter. For example, a measurement of popularity of a program may corresponding to a value for the trending parameter and, in turn, be used as a basis to generate the cost information. According to another example, the locale or service area may be associated with a current event. For example, a news event may stem from an occurrence associated with the locale and, in turn, the value of the trending parameter may be used as a basis to generate the cost information. Also, the policies may assign a particular cost to various metrics associated with a throughput and/or other QoS parameters (e.g., priority, packet loss, packet delay, etc.) that may be correlated to the timeslot.

Trending device 125 may include logic that obtains and analyzes information to determine whether a trend exists in relation to programs and/or locales. Trending device 125 may be implemented to include a business informatics or trending analytics system, a network probe, or some other network element that measures trends across all program sources that may store and make available programs for the OTT multicast service. For example, trending device 125 may compare consumption parameters and their values, which are included in the obtained information, to threshold consumption parameters and threshold values. Trending device 125 may use the result of the comparison to determine whether an opportunity, via the OTT multicast service, for delivery of a program and/or the delivery of content pertaining to digital signage in a locale or service area. For example, trending device 125 may determine a degree of popularity of a program. Trending device 125 may also obtain other types of information from third party and/or social media sources regarding advertising, promotions, or other program-related data that may be indicative of the popularity of the program. When trending device 125 determines that a program is popular or other criterion related to a trend, trending device 125 may generate trigger data based on a result of the analysis. For example, the trending data may indicate a value or a score corresponding to the degree of popularity, along with other information pertaining to the popularity of the program (e.g., the name of the program, geographic information, etc.). According to another example, trending device 125 may include data mining logic that accumulates social media data to identify an event that is considered a trend or carries a certain degree of interest among people. Depending on the example, the event may be associated with a locale. Also, the domain of the people may be limited to a particular region or may span nationally. Trending device 125 may generate trigger data based on a result of the analysis. For example, the trending data may indicate a value or a score corresponding to the degree of interest, along with other information pertaining to the trend (e.g., geographic information, description of the event, program, etc.). Trending device 125 may transmit the trigger data to OTT multicast service controller device 130.

OTT multicast service controller device 130 includes logic that manages the OTT multicast service, as described herein. For example, OTT multicast service controller device 130 may coordinate functions and operations performed by portal device 110, bidding device 115, charging and policy device 120, trending device 125, delivery controller device 135, and program device 140, in support of the OTT multicast service.

OTT multicast service controller device 130 includes logic that receives trending data from trending device 125. OTT multicast service controller device 130 may generate timeslot information based on the trending data. For example, OTT multicast service controller device 130 may use a rule-based logic that correlates values of the timeslot information (e.g., a time period, a date, a delivery parameter, the geographic service area, etc.) to the trending data.

OTT multicast service controller device 130 also includes logic that generates timeslot information based on the network resources that are available. For example, OTT multicast service controller device 130 may store and/or obtain network resource information. The network resource information may be correlated to a locale or a service area, a date, and a time period. Additionally, as described herein, for example, the network resource information may indicate network resources which are pre-provisioned and/or network resources that may be dynamically created on-demand. In this way, OTT multicast service controller device 130 may divide the available network resources based on the parameters associated with the timeslot information, as described herein. For example, OTT multicast service controller device 130 includes logic that may calculate various time periods (e.g., 15 minute blocks of time, 30 minute blocks of time, 3 hour blocks of time, or other lengths of time), various locales, various throughputs, and so forth, based on the network resource information. By way of further example, with respect to a particular locale and/or network resource, OTT multicast service controller device 130 may calculate multiple and different divisions of the network resource, such as different time periods (e.g., a 10 minute block, a 60 minute block, etc.), different throughputs (e.g., 25 Mbps, 5 Mbps, etc.), and so forth. In this way, program providers may secure timeslots, which are published by bidding device 115, and which may align with various types of programs (e.g., digital signage content versus a movie, etc.), various dates and time periods, different geographical areas (e.g., a commercial store versus a city, etc.), various types of throughput, other QOS parameters, and so forth.

OTT multicast service controller device 130 includes logic that generates and transmits a request to charging and policy device 120. The request may include the timeslot information and data requesting cost information for the timeslot information. OTT multicast service controller device 130 includes logic that receives a response from charging and policy device 120. The response may include the cost information calculated by charging and policy device 120.

OTT multicast service controller device 130 includes logic that generates and transmits a request to bidding device 115. The request may include the timeslot information, the cost information, and data indicating to publish the available timeslot. In response to receiving this information, bidding device 115 may publish the available timeslot so that program providers may consider whether to secure the timeslot for use. OTT multicast service controller device 130 includes logic that receives a response from bidding device 115. The response may include data indicating acquisition of the timeslot by a program provider. In response to receiving this response, OTT multicast service controller device 130 includes logic that generates and transmits a request to delivery controller device 135. The request may include the timeslot information and a network address (e.g., a URI) indicating a location of the program. For example, program device 140 may provide the URI to OTT multicast service controller device 130 subsequent to the acquisition of the timeslot by the program provider.

Delivery controller device 135 includes logic that manages the setting up of the delivery of programs via network 150. Delivery controller device 135 may include logic that obtains (e.g., downloads, caches, etc.) programs that are scheduled to be delivered (e.g., multicasted) during the secured timeslots. For example, in response to receiving a request from OTT multicast service controller device 130, delivery controller device 135 may obtain the program for subsequent multicast delivery. Delivery controller device 135 may also obtain metadata pertaining to the program. Alternatively, delivery controller device 135 may transmit the URI of the program to a selected network device, as described below. The selected network device may then obtain the program that is to be delivered during the secured timeslot.

Delivery controller device 135 includes logic that selects a network device in network 150 for delivering the program via a multicast. For example, delivery controller device 135 may select a network device based on the locale or service area in which the program is to be delivered. Delivery controller device 135 may also select a network and/or a network device based on other considerations, such as for example, available network resources, current and projected load, or other network management parameters. Delivery controller device 135 may transmit the timeslot information to the selected network device. The selected network device may use a pre-provisioned bearer for delivering the program or may dynamically create a bearer for delivering the program. Depending on the implementation of network 150, delivery controller device 135 may include logic that controls, manages, instantiates, spawns, tears down, kills, etc., various virtualizations (e.g., hypervisors, containers, virtual machines, etc.) in support of the delivery of the programs based on the OTT multicast service, or instructs the network device to perform these tasks.

Delivery controller device 135 includes logic that interfaces with various types of networks corresponding to network 150, as described herein. In this way, the OTT multicast service may facilitate the delivery of programs across a wide range of network technologies and delivery systems on behalf of the program providers that subscribe to the OTT multicast service.

Program device 140 includes logic that provides OTT multicast service controller device 130 with the location of the program. For example, program device 140 may be a part of a network associated with the program provider (not illustrated). Program device 140 and/or OTT multicast service controller device 130 may provide information (e.g., a timeslot identifier or other data) during their communication that correlates the location of the program to the secured timeslot information. Program device 140 may use a Representational State Transfer (REST) Application Programming Interface (API) for interfacing with the OTT Multicast service, or other type of well-known communication interface.

Network 150 includes one or multiple networks of one or multiple types that provide for the delivery of programs during the secured timeslots. Network 150 may be implemented to include a terrestrial-based network. Network 150 may be implemented to distribute programs using various technologies, an Internet Protocol (IP) TV architecture, a wireless network architecture, an Internet-based architecture, a program streaming architecture, a cloud architecture, and/or other type of content delivery network (CDN) architecture. For example, network 150 may be implemented to include a radio access network (RAN), a core network, a mobile network, a video streaming network, a television distribution network, the Internet, a public network, a private network, a cloud network, the World Wide Web, a packet-switched network, a private network, a public network, a telecommunication network, or a content delivery network.

Depending on the architecture implemented, network 150 may include various types of network devices that contribute to the provisioning and distribution of the programs based on the timeslot information. Although not illustrated, network 150 may be implemented to include, for example, a web server, a streaming server, a file server, an origin server, a super headend (SHE) device, a video hub office (VHO) device, a video serving office (VSO) device, a cloud device, a virtual machine, or other type of network device that may deliver the program to end devices. Additionally, network 150 may include various network devices that support multicast delivery of the program. For example, network 150 may provide a Multimedia Broadcast Multicast Service (MBMS) or an evolved (MBMS). Network 150 may also provide other delivery services, such as unicasting, downloading, streaming, etc. Network 150 may include multiple networks associated with multiple content delivery providers that allow programs to be delivered on a national or international scale associated with various locales and geographic regions small and large.

The term "program," as used herein, is intended to be interpreted as audio content, visual content, or audio and visual content. For example, a program may include audio data, video data, audio and video data, image data, textual data, animation data, multimedia data, Web data, Internet data, or some combination thereof. For example, a program may correspond to a movie, a television program, a live program, a pre-recorded program, a pay-per-view program, a documentary, a reality show, a music event, a sporting event, or some other type of entertainment event (e.g., a news event, etc.). A program may also correspond to a song, a collection of songs, a music video, or other form of a music package. A program may further correspond to a file, a sequence of files, a machine-to-machine M2M file, or other form of a file package. Further, a program may also correspond to an advertisement, a commercial, or other form of an advertisement package. A program may be in various types of resolutions, bitrates, compressions, encodings/decodings, frame rates, aspect ratios, languages, sample rates, and so forth. The OTT multicast service may allow the program provider an ability to deliver during a secure timeslot a program package that includes a single type or multiple types and combinations of programs.

End device 170 includes a device that has computational and communication capabilities. End device 170 may be implemented as a mobile device, a portable device, or a stationary device. By way of further example, end device 170 may be implemented as a smartphone, a tablet, a netbook, a phablet, a computer (e.g., a laptop, a desktop, a palmtop, etc.), a terminal, and so forth. According to an exemplary embodiment, end device 170 provides a user (e.g., a program provider) access to the OTT Multicast service, as described herein. For example, end device 170 may include a client, such as a web browser or other suitable software application that allows the user to access and use the OTT multicast service via portal device 110.

End device 180 includes a device that has computational and communication capabilities that is able to receive the program via network 150. End device 180 may be implemented to include any type of end device 170. Additionally, end device 180 may include other types of user end devices, such as a set top box, an infotainment system in a vehicle, a smart television, a music playing device, or some other type of user device. Further, end device 180 may be implemented to include other types of device, such as a digital signage device, an Internet of Things (IoT) device, or some other type of end node that may receive the program. End device 180 may also include logic that presents the program to an end user of end device 180.

Figure 2A:
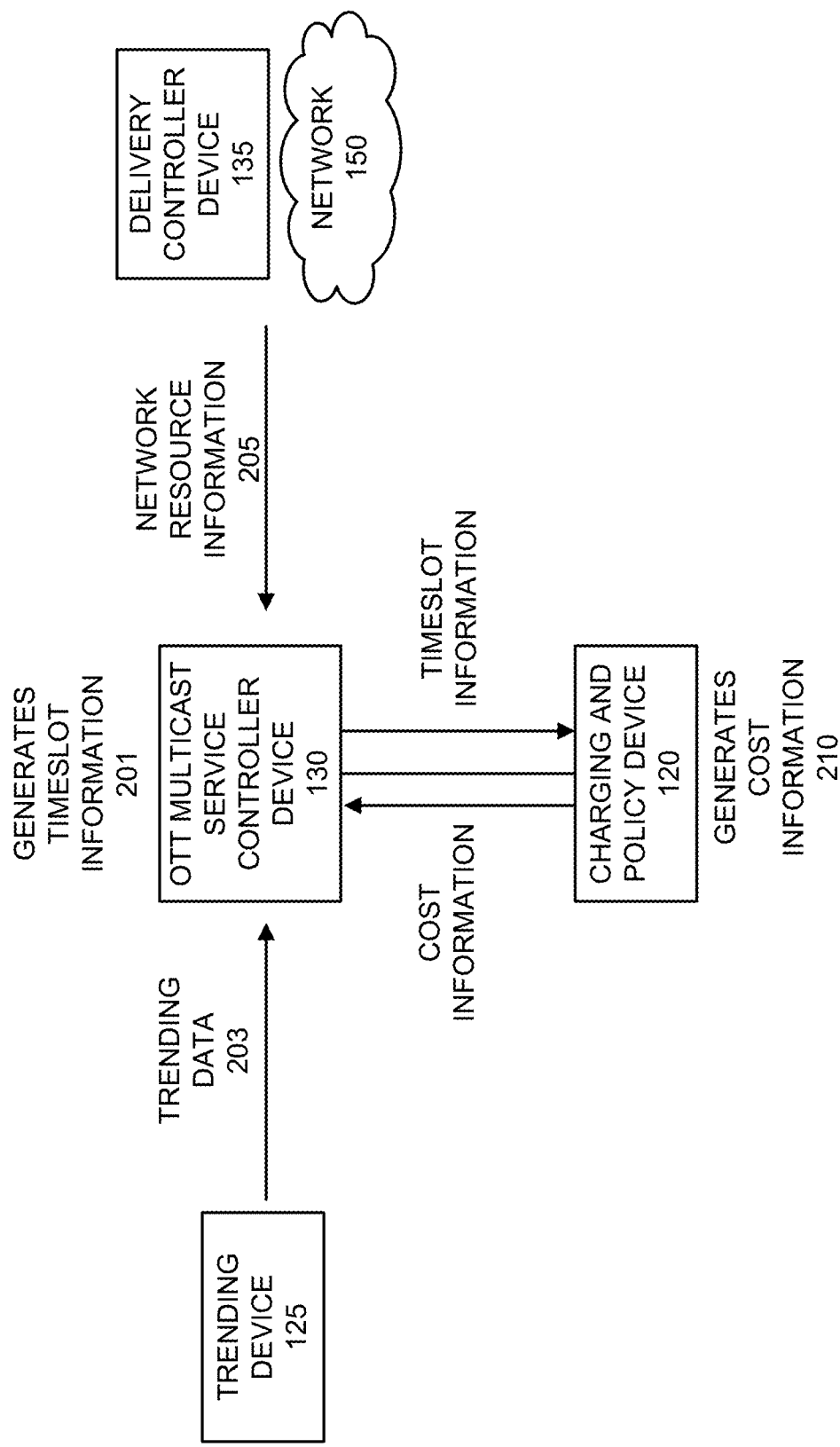

FIGS. 2A-2G are diagrams illustrating an exemplary process of the OTT multicast service. Referring to FIG. 2A, OTT multicast service controller device 130 may generate timeslot information (201). For example, OTT multicast service controller device 130 may generate timeslot information based on trending data (203) obtained from trending device 125. Additionally, or alternatively, OTT multicast service controller device 130 may generate timeslot information based on network resource information (205) obtained from delivery controller device 135, network 150, and/or some other network device (not illustrated). The network resource information may indicate available or unused network resources associated with network resources of network 150. The available or unused network resources may be correlated to a locale or service area, date, and time period. The available or unused network resources may be calculated based on current load (e.g., associated with the secured timeslots currently being serviced) and/or future loads (e.g., associated with future secured timeslots that will be serviced) relative to total available network resources.

As illustrated, in response to the generation of the timeslot information, OTT multicast service controller device 130 may transmit the timeslot information to charging and policy device 120. In response to receiving the timeslot information, charging and policy device 120 may generate cost information (210). For example, as previously described, charging and policy device 120 may use policies that govern the calculation of cost information based on the timeslot information. In response to the generation of the cost information, charging and policy device 120 may transmit the cost information to OTT multicast service controller device 130.

Figure 2B:
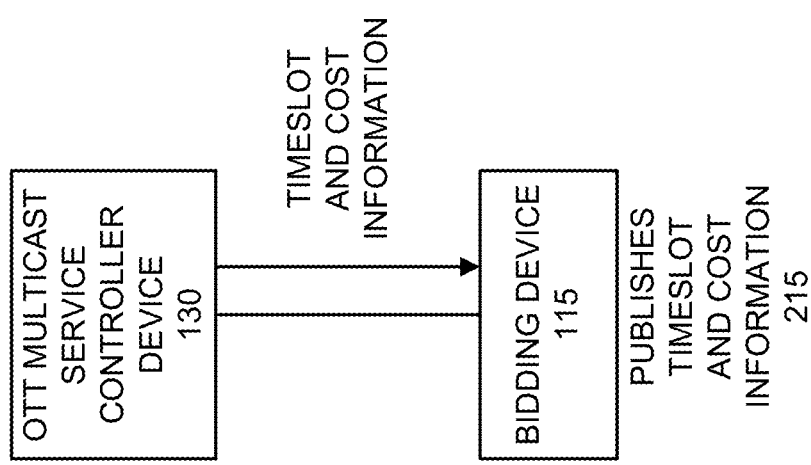

Referring to FIG. 2B, in response to receiving the cost information, OTT multicast service controller device 130 may transmit the timeslot information and the cost information to bidding device 115. Bidding device 115 may publish the timeslot and cost information (215). In this way, subscribers of the OTT multicast service may bid on the available timeslot. Depending on the current time relative to the timeslot, the length of time the available timeslot is published may vary. As an example, the timeslot may be a day or more in the future or, perhaps, minutes from the current time.

Figure 2C:
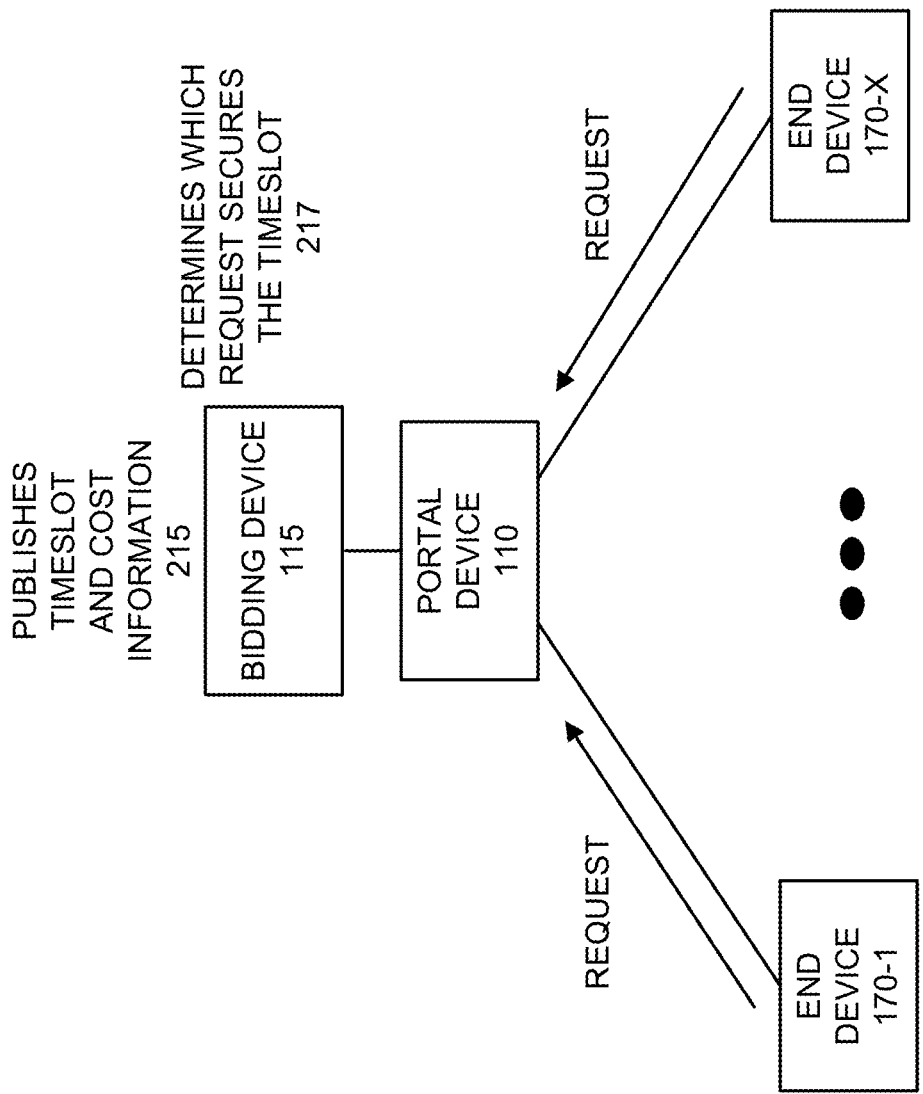
Figure 2D:
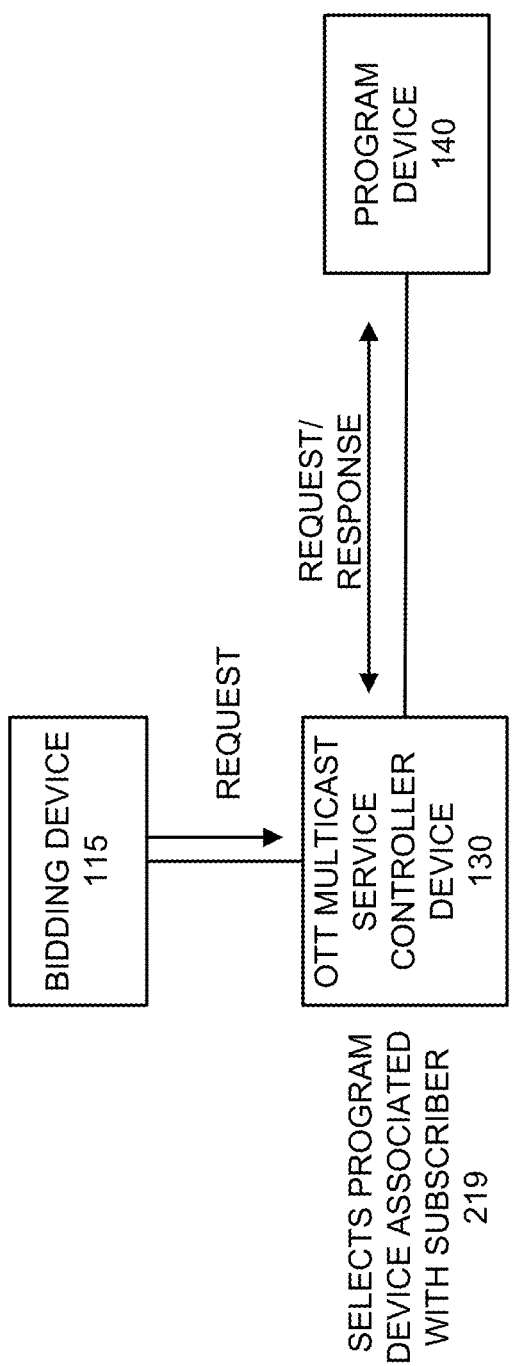

Referring to FIG. 2C, assume that users of end devices 170 had successfully logged into portal device 110 and accessed the user interface of bidding device 115. Users may view the timeslot and cost information published by bidding device 115. Users may transmit requests, via end devices 170, to bidding device 115 in attempt to secure the available timeslot. Based on the requests received, bidding device 115 may determine which request secures the available timeslot (217). According to various exemplary implementations, bidding device 115 may determine which request secures the available timeslot based on a first-come first-served basis, an expiration of the time period that the available timeslot is published, and/or a monetary amount associated with the request (e.g., a user may bid below, equal to, or above the cost information calculated by bidding device 115). Referring to FIG. 2D, assume that the user of end device 170-1 secured the available timeslot, and bidding device 115 transmits a request to OTT multicast service controller device 130 indicating details regarding the user and secured available timeslot. For example, the request may include a subscriber identifier of the user and, the timeslot information and/or an identifier that identifies the timeslot information. The request may also indicate to provision the delivery of a program. Although not illustrated, bidding device 115 and/or portal device 110 may transmit information to a billing system so that the user is invoiced for the timeslot.

In response to receiving the request, OTT multicast service controller device 130 may communicate with program device 140. For example, OTT multicast service controller device 130 may select program device 140 associated with the subscriber (219), from among other program devices 140 that may be associated with other subscribers, based on the request received from bidding device 115. For example, OTT multicast service controller device 130 may select program device 140 based on the subscriber identifier or the subscriber identifier and timeslot information (e.g., locale associated with timeslot, etc.). OTT multicast service controller device 130 may obtain the URI of the program that is to be multicasted during the secured timeslot from program device 140. For example, program device 140 may be provisioned with the URI that indicates the location of the program pertaining to the secured timeslot. OTT multicast service controller device 130 may store OTT multicast data in support of the OTT multicast service. For example, OTT multicast service controller device 130 may include a database management system (DBMS). The DBMS may be implemented using conventional, well-known, or commercially available relational or No Structured Query Language (NoSQL) software/packages (e.g., Microsoft SQL, Oracle Database, Cassandra, MongoDB, etc.). OTT multicast service controller device 130 may include a storage device that stores a database. Exemplary OTT multicast service data is described further below.

Figure 3A:
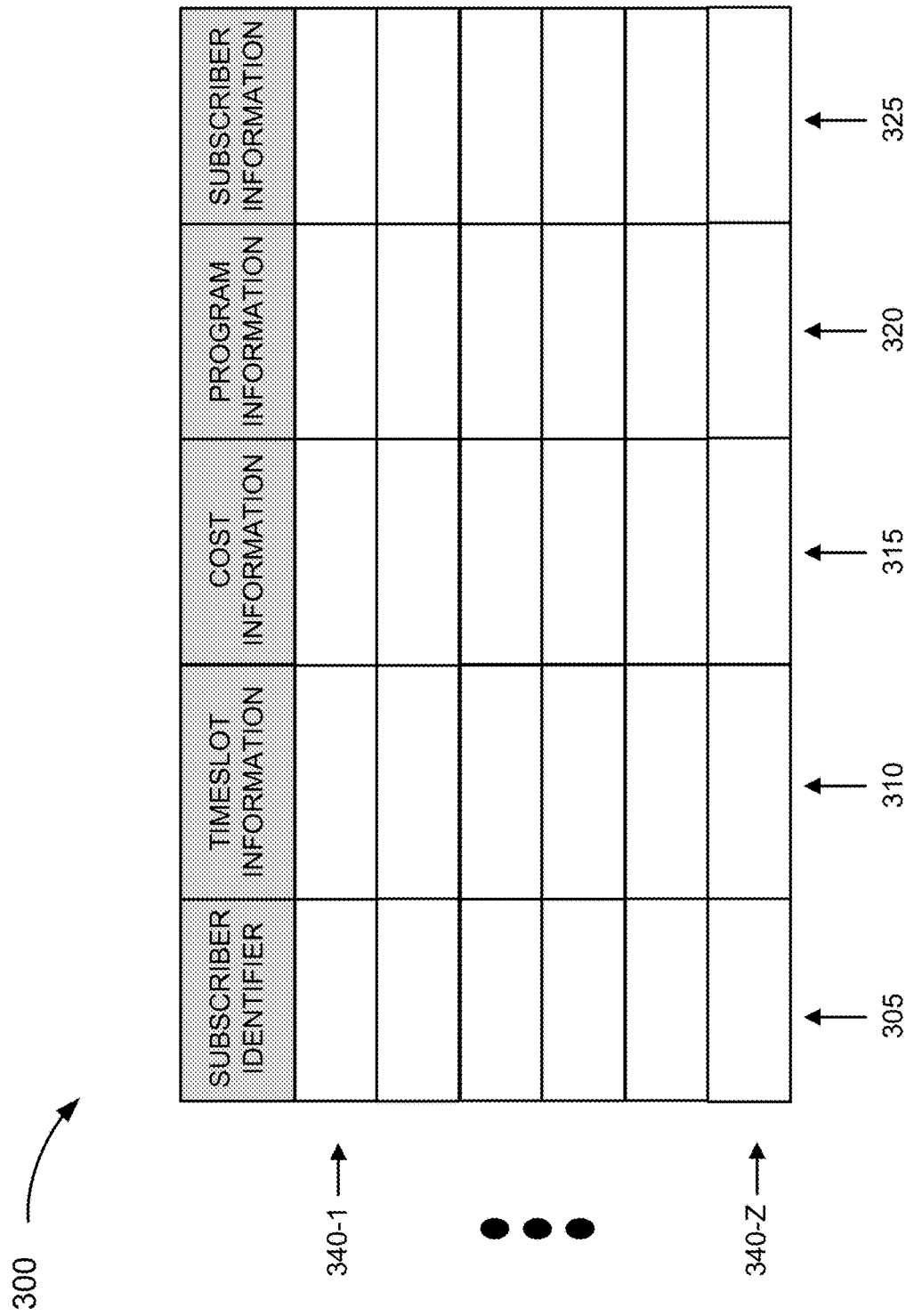
FIG. 3A is a diagram illustrating an exemplary data structure that stores exemplary data that supports the OTT multicast service.

Referring to FIG. 3A, an exemplary table 300 is illustrated, which stores exemplary OTT multicast service data. Table 300 includes a subscriber identifier field 305, a timeslot information field 310, a cost information field 315, a program information field 320, and a subscriber information field 325. As further illustrated, table 300 includes records 340-1 through 340-Z that each includes a grouping of fields 305 through 325 that may be correlated. The OTT multicast service data is illustrated in tabular form merely for the sake of description. The OTT multicast service data may be implemented in a data structure different from a table.

Subscriber identifier field 305 may store data that indicates a unique identifier that identifies a user, an account, and/or a subscription of the OTT multicast service. Timeslot information field 310 may store data that indicates timeslot information. Cost information field 315 may store data that indicates a monetary amount associated with the timeslot information. Program information field 320 may store data that indicates a URI of the program to be delivered during the timeslot. Subscriber information field 325 may store data indicating a network address of program device 140. According to some exemplary implementations where the subscriber has a distributed network, subscriber information field 325 may store multiple network addresses of program devices 140, which may be correlated with multiple locales or service areas.

According to other exemplary implementations, table 300 may store additional, fewer, and/or different instances of OTT multicast service data in support of the OTT multicast service, as described herein. For example, the OTT multicast service data may include network resource information, as previously described.

Figure 2E:
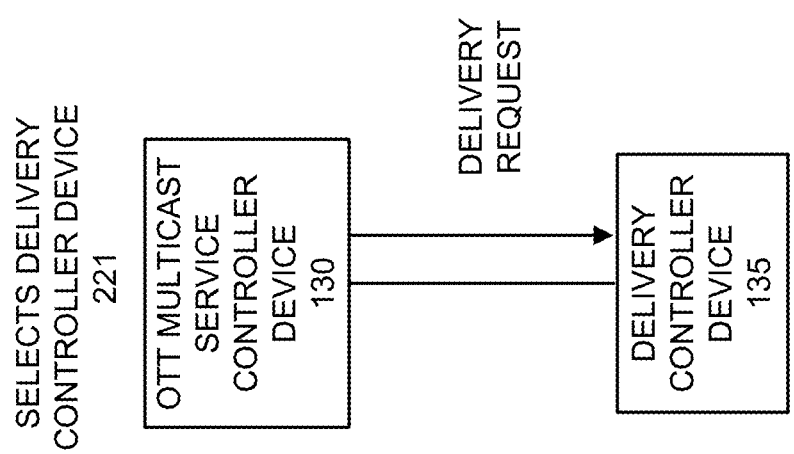

Referring to FIG. 2E, in response to obtaining the URI of the program to be delivered during the secured timeslot, OTT multicast service controller device 130 selects a delivery controller device (221) so that the delivery of the program during the secured timeslot may be provisioned. According to an exemplary implementation, when the OTT multicast system is distributed, OTT multicast service controller device 130 may select one or multiple delivery controller devices 135 that are closest to the locale within which the program is to be delivered during the secured timeslot. OTT multicast service controller device 130 transmits a delivery request to the selected delivery controller device 135. The delivery request includes the timeslot information and the URI of the program. The delivery request may include other types of information to facilitate the delivery of the program.

Figure 2F:
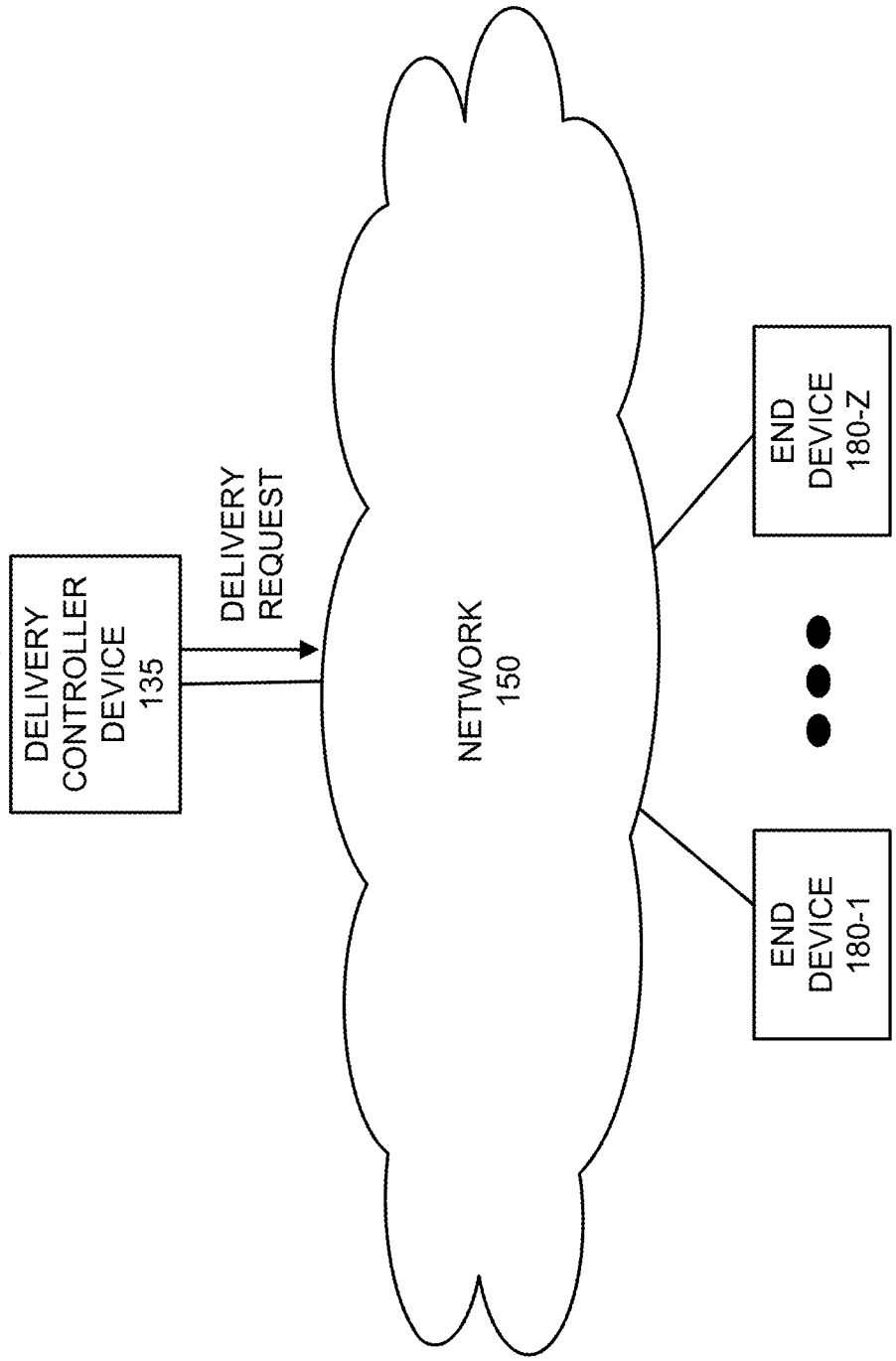

Referring to FIG. 2F, in response to receiving the delivery request, delivery controller device 135 may store the information included in the delivery request. For example, the delivery request may include the timeslot information and the URI of the program. Delivery controller device 135 may store the data carried in the delivery request. For example, delivery controller device 135 may store provisioning data that assists in the provisioning of the delivery of the program. For example, delivery controller device 135 may include a DBMS. Delivery controller device 135 may include a storage device that stores a database. Exemplary provisioning data is described further below.

Figure 3B:
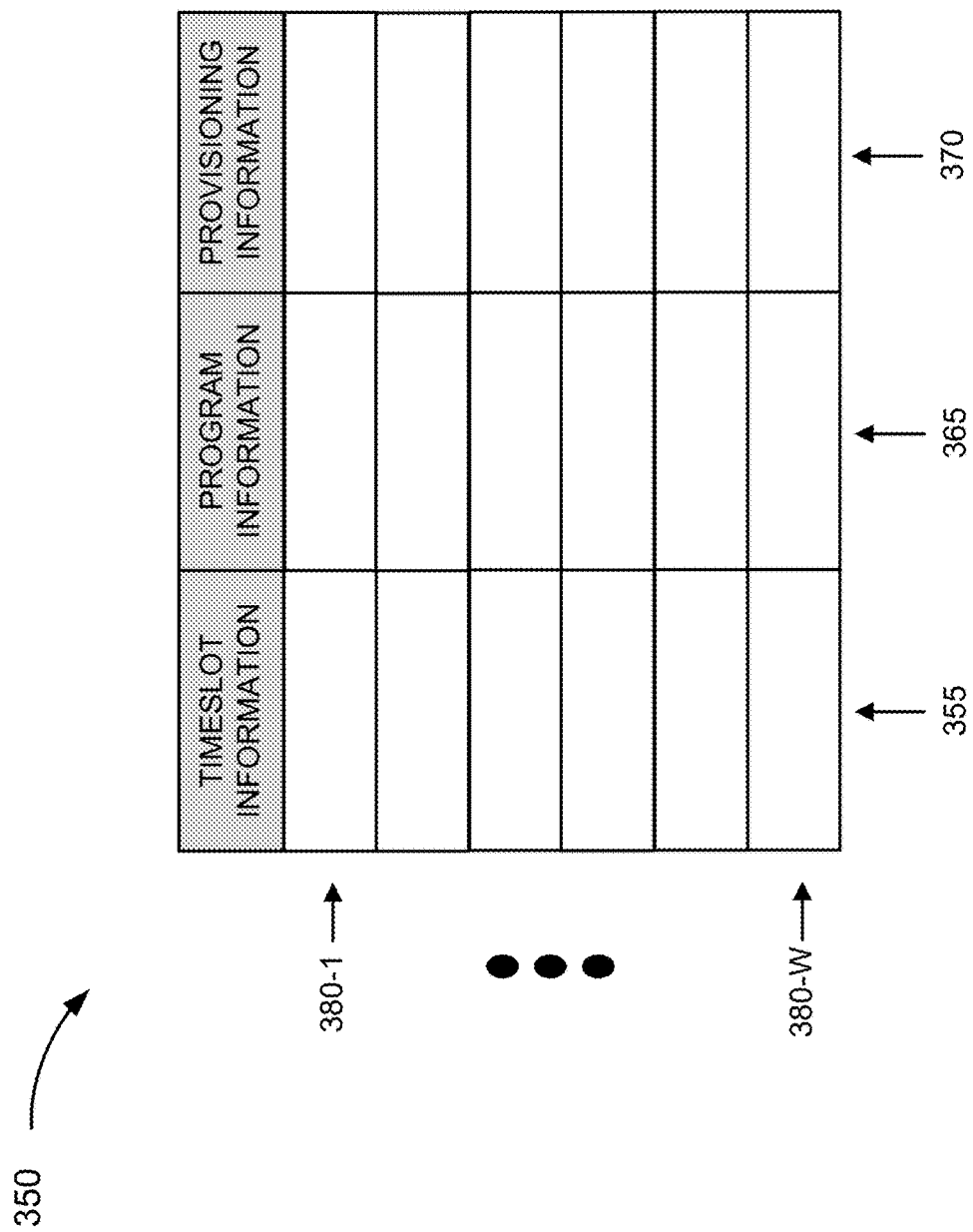
FIG. 3B is a diagram illustrating an exemplary data structure that stores other exemplary data that supports the OTT multicast service.

Referring to FIG. 3B, an exemplary table 350 is illustrated, which stores exemplary provisioning data. Table 350 includes a timeslot information field 355, a program information field 365, and a provisioning information field 370. As further illustrated, table 350 includes records 380-1 through 380-W that each includes a grouping of fields 355 through 370 that may be correlated. The provisioning data is illustrated in tabular form merely for the sake of description. The provisioning data may be implemented in a data structure different from a table.

Timeslot information field 355 may store data that indicates timeslot information. Program information field 365 may store data that indicates a URI of the program to be delivered during the timeslot. Provisioning information field 370 may include network resource information. For example, the network resource information may indicate network addresses of network devices that may be used to facilitate and/or provide the delivery of the program, identifiers of network devices, bearers, and/or other resources, data indicating whether pre-provisioned or dynamically provisioned resources are to be used, and so forth.

According to other exemplary implementations, table 350 may store additional, fewer, and/or different instances of delivery data in support of the OTT multicast service, as described herein.

Referring back to FIG. 2F, delivery controller device 135 may provision the delivery of the program (225) so that the program is delivered during the secured timeslot. For example, delivery controller device 135 may transmit a delivery request to one or multiple network devices (not illustrated) of network 150. As previously described, depending on the implementation, delivery controller device 135 may manage the dynamic provisioning of network resource to support the delivery of the program. Additionally, or alternatively, network resources that support the delivery of the program may be pre-provisioned. The delivery request may include the timeslot information and the program information. The delivery request may include other information that facilitates the provisioning and delivery of the program. Referring to FIG. 2G, as illustrated, network 150 may deliver the program to end devices 180 according to the timeslot information, program information, etc. For example, network 150 may multicast the program to end devices 180 in a service area.

Although FIGS. 2A-2G illustrate an exemplary process of the OTT multicast service, according to other exemplary embodiments, additional, fewer, and/or different operations of the OTT multicast service may be performed.

FIG. 4 is a diagram illustrating exemplary components of a device 400 that may correspond to one or more of the devices described herein. For example, device 400 may correspond to components included in portal device 110, bidding device 115, charging and policy device 120, trending device 125, OTT multicast service controller device 130, delivery controller device 135, program device 140, end device 170, and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application that provides a function and/or a process. As an example, with reference to portal device 110, software 420 may include an application that, when executed by processor 410, provides the functions of the OTT multicast service, as described herein. Similarly, other network devices (e.g., bidding device 115, charging and policy device 120, trending device 125, OTT multicast service controller device 130, delivery controller device 135) illustrated in network 105 may each include an application that, when executed by processor 410, provides the functions of the OTT multicast service, as described herein. Software 420 may also include firmware, middleware, microcode, hardware description language (HDL), and/or other form of instruction. Also, software 420 may include an operating system (e.g., Linux, Windows, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
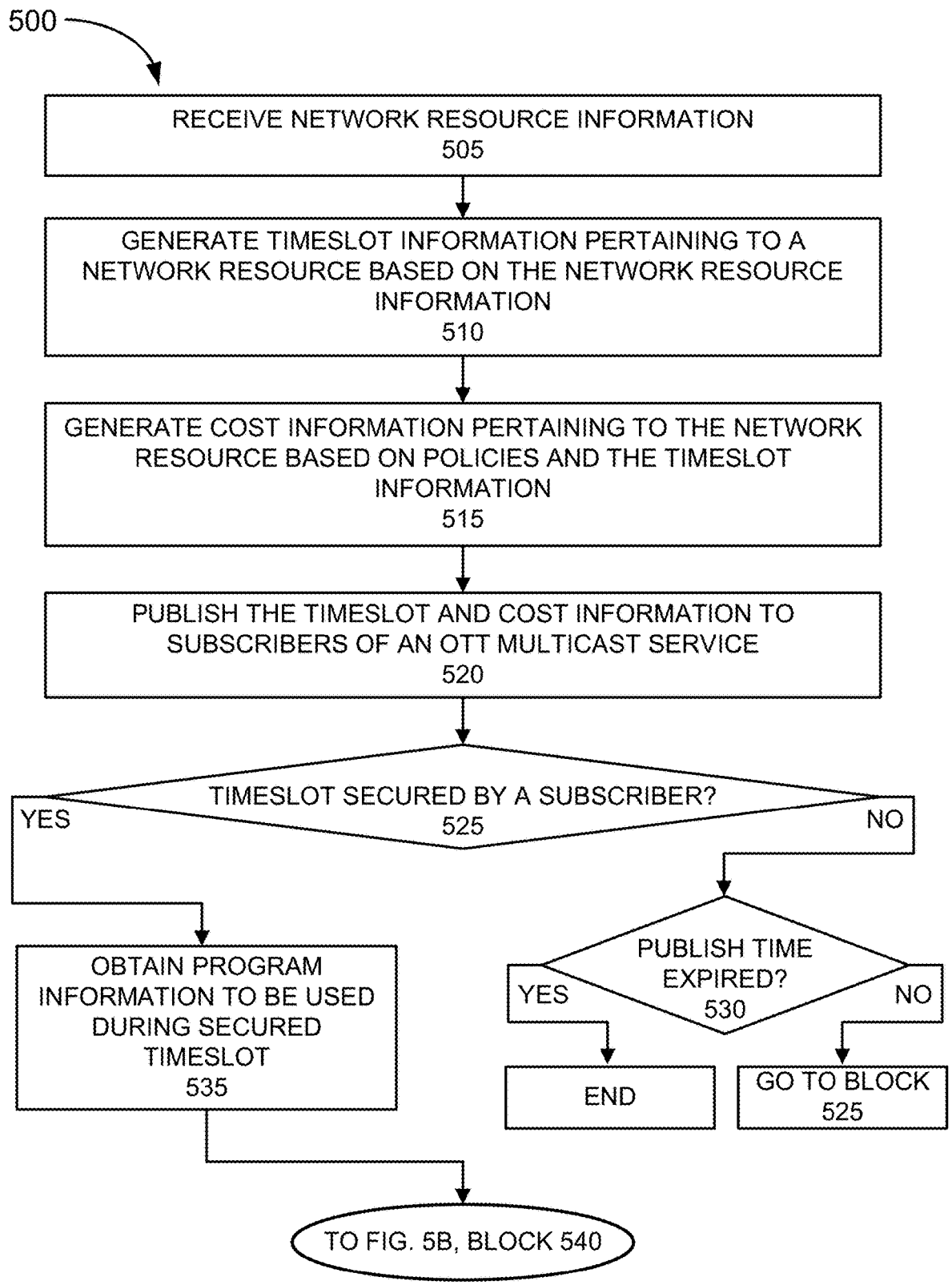
FIGS. 5A and 5B are flow diagrams illustrating an exemplary process of an exemplary embodiment of the OTT multicast service.
Figure 5B:
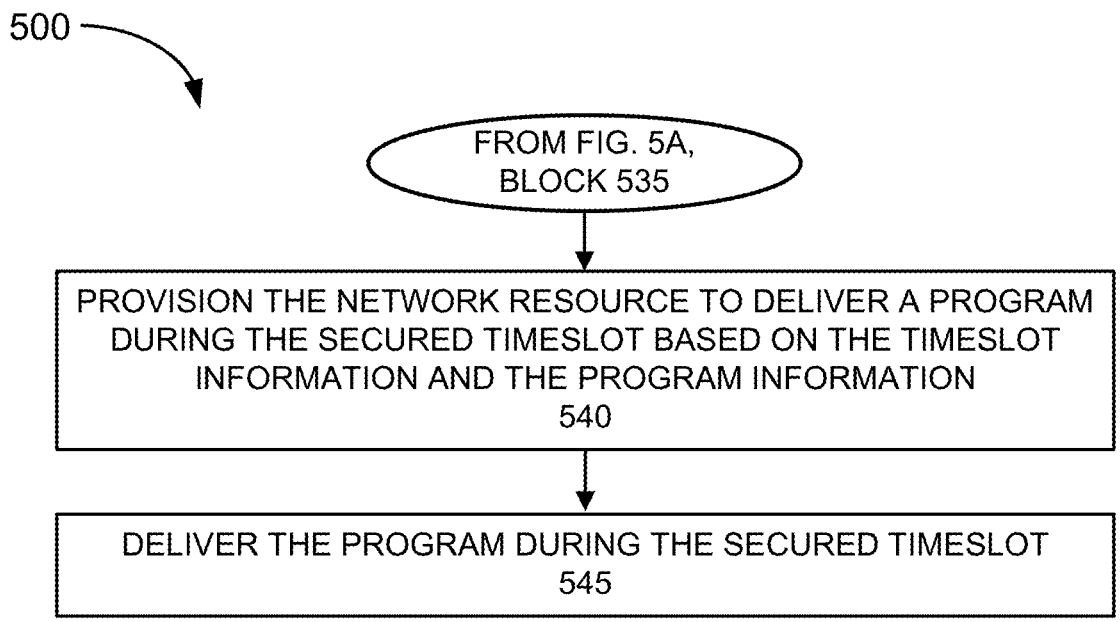

FIGS. 5A and 5B are flow diagrams illustrating an exemplary process 500 of an exemplary embodiment of the OTT multicast service. Process 500 is directed to a process previously described with respect to FIGS. 2A-2G, as well as elsewhere in this description, in which the OTT multicast service is provided. According to an exemplary embodiment, an OTT multicast system performs steps of process 500. For example, processor 410 executes software 420 to perform the steps illustrated in FIGS. 5A and 5B, and described herein.

Referring to FIG. 5A, in block 505 of process 500, network resource information is received. For example, OTT multicast service controller device 130 may obtain network resource information that indicates network resources that are available. The network resource information may be correlated to a locale or a service area, a date, and a time period.

In block 510, timeslot information pertaining to a network resource is generated based on the network resource information. For example, OTT multicast service controller device 130 may calculate various time periods (e.g., 15 minute blocks of time, 30 minute blocks of time, 3 hour blocks of time, or other lengths of time), various locales, various throughputs, and so forth, based on the network resource information. OTT multicast service controller device 130 may generate timeslot information based on trending data.

In block 515, cost information pertaining to the network resource is generated based on policies and the timeslot information. For example, charging and policy device 120 may store and use policies that govern the calculation of cost information based on the timeslot information. For example, the policies may assign a particular cost to a timeslot based on the date, time period, the locale or service area, and delivery parameters.

In block 520, the timeslot and cost information are published to subscribers of an OTT multicast service. For example, bidding device 115 may publish the available timeslot via a user interface that can be accessed by subscribers of the OTT multicast service.

In block 525, it is determined whether the timeslot is secured by a subscriber. For example, bidding device 115 may determine which request secures the available timeslot based on a first-come first-served basis, an expiration of the time period that the available timeslot is published, and/or a monetary amount associated with the request.

When it is determined that the timeslot is not secured (block 525—NO), it is determined whether a publication time has expired (block 530). For example, in response to determining that the timeslot is not secured, bidding device 115 may determine whether the publication time has expired. Bidding device 115 may use a timer and a publication time associated with the available timeslot to determine whether the publication time has expired.

When it is determined that the publication time has not expired (block 530—NO), process 500 may return to block 525. When it is determined that the publication time has expired (block 530—YES), process 500 may end. For example, according to an exemplary implementation, the current time relative to the time period of the timeslot information may overlap. According to another exemplary implementation, the current time is so close in time to the time period of the timeslot information that a program would not be able to be provisioned in time. According to yet other exemplary implementations, the publication time may be configured based on other parameters that, when the publication time expires, the timeslot no longer is available to the subscribers.

When it is determined that the timeslot is secured (block 525—YES), program information to be used during the secured timeslot information is obtained (block 535). For example, OTT multicast service controller device 130 may obtain the URI of the program from program device 140.

Referring to FIG. 5B, in block 540, the network resource to deliver a program during the secured timeslot is provisioned based on the timeslot information and the program information. For example, delivery controller device 135 may provision the delivery of the program based on the timeslot information and the program information. Depending on the network resources allocated or projected to be used to deliver the program, delivery controller device 135 may use provisioning data to facilitate the provisioning of network resources.

In block 545, the program is delivered during the secured timeslot. For example, network 150 may multicast the program to end device 180 based on the timeslot information.

Although FIGS. 5A and 5B illustrate an exemplary process 500 of the OTT multicast service, according to other embodiments, process 500 may include additional operations, fewer operations, and/or different operations than those illustrated in FIGS. 5A and 5B, and described herein. For example, at block 520, the OTT multicast service may generate and transmit a notification to a user to alert the user of the publication and the available timeslot. Additionally, for example, at block 530—YES, the OTT multicast service may recalculate timeslot information and/or cost information based on the amount of remaining time and network resources previously calculated. As an example, when the publication time ends when the timeslot begins, the OTT multicast service may divide the available network resources, given some buffer time from the current time, in attempt to allow users to secure the remaining portion of the timeslot.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:

receiving, by a network device, network resource information pertaining to a network;

generating, by the network device in response to the receiving, timeslot information pertaining to a network resource of the network based on the network resource information, wherein the timeslot information indicates a date and a time period in which the network resource is available for use by subscribers of an over-the-top (OTT) multicast service to deliver programs to end users, wherein the subscribers are program providers;

generating, by the network device in response to the generating of the timeslot information, cost information based on policies and the timeslot information;

publishing, by the network device in response to the generating of the cost information, the timeslot information and the cost information to the subscribers;

determining, by the network device in response to the publishing, whether one of the subscribers has secured the network resource available during the date and the time period;

obtaining, by the network device in response to determining that the one of the subscribers has secured the network resource, program information that includes a uniform resource identifier of one of the programs that is to be delivered during the date and time period using the network resource; and provisioning, by the network device in response to the obtaining, the network resource to deliver the one of the programs to at least one of the end users based on the program information and the timeslot information.

2. The method of claim 1, wherein the network resource of the network includes a pre-provisioned network resource or a dynamically-created network resource, and wherein the timeslot information indicates a geographic service area to which a timeslot is directed and a delivery parameter pertaining to a delivery of a candidate program.

3. The method of claim 2, wherein the delivery parameter indicates at least one of a throughput value or an other quality of service value.

4. The method of claim 2, further comprising:
obtaining, by the network device, trending data pertaining to the geographic service area, wherein the trending data indicates a measurement of a trend for a program source, and wherein the generating of the cost information further comprises:
generating, by the network device, the cost information based on the policies, the timeslot information, and the trending data.

5. The method of claim 1, wherein the generating of the timeslot information further comprises:
calculating, by the network device, multiple and different time periods in which the network resource is available.

6. The method of claim 1, further comprising:
receiving, by the network device from an end device of the one of the subscribers, a request to log in to the OTT multicast service;
validating, by the network device, the request to log in based on subscription information of the one of the subscribers, and wherein the determining whether the one of the subscribers has secured the network resource, further comprises:
receiving, by the network device from the end device, a request indicating to secure the network resource.

7. The method of claim 1, further comprising:
storing, by the network device, subscription information of the one of the subscribers, wherein the subscription information includes a network address of a program device that stores the program.

8. The method of claim 1, wherein the provisioning further comprises:
spawning, by the network device, one or more virtualization entities in the network to deliver the program, wherein one or more locations at which the one or more virtualization entities are spawned are selected based on one or more geographic service areas associated with the timeslot information.

9. A network device comprising:
a communication interface;
a memory, wherein the memory stores instructions; and
a processor, wherein the processor executes the instructions to:
receive, via the communication interface, network resource information pertaining to a network;
generate, in response to the receipt of the network resource information, timeslot information pertaining to a network resource of the network based on the network resource information, wherein the timeslot information indicates a date and a time period in which the network resource is available for use by subscribers of an over-the-top (OTT) multicast service to deliver programs to end users, wherein the subscribers are program providers;
generate, in response to the generation of the timeslot information, cost information based on policies and the timeslot information;
publish, in response to the generation of the cost information, the timeslot information and the cost information to the subscribers;
determine, in response to the publication, whether one of the subscribers has secured the network resource available during the date and the time period;
obtain, in response to a determination that the one of the subscribers has secured the network resource, program information that includes a uniform resource identifier of one of the programs that is to be delivered during the date and time period using the network resource; and
provision, in response to the obtainment, the network resource to deliver the one of the programs to at least one of the end users based on the program information and the timeslot information.

10. The network device of claim 9, wherein the network resource of the network includes a pre-provisioned network resource or a dynamically-created network resource, and wherein the timeslot information indicates a geographic service area to which a timeslot is directed and a delivery parameter pertaining to a delivery of a candidate program.

11. The network device of claim 10, wherein the delivery parameter indicates at least one of a throughput value or an other quality of service value, and wherein the processor further executes the instructions to:
store subscription information of the one of the subscribers, wherein the subscription information includes a network address of a program device that stores the program.

12. The network device of claim 10, wherein the processor further executes the instructions to:
obtain, via the communication interface, trending data pertaining to the geographic service area, wherein the trending data indicates a measurement of a trend for a program source, and wherein, when generating the cost information, the processor further executes the instructions to:
generate the cost information based on the policies, the timeslot information, and the trending data.

13. The network device of claim 9, wherein, when generating the timeslot information, the processor further executes the instructions to:

calculate multiple and different time periods in which the network resource is available.

14. The network device of claim 9, wherein the processor further executes the instructions to:
receive, via the communication interface from an end device of the one of the subscribers, a request to log in to the OTT multicast service;
validate the request to log in based on subscription information of the one of the subscribers, and wherein, when determining whether the one of the subscribers has secured the network resource, the processor further executes the instructions to:
receive, via the communication interface, from the end device, a request indicating to secure the network resource.

15. The network device of claim 9, wherein, when provisioning, the processor further executes the instructions to:
spawn one or more virtualization entities in the network to deliver the program, wherein one or more locations at which the one or more virtualization entities are spawned are selected based on one or more geographic service areas associated with the timeslot information.

16. A non-transitory, computer-readable storage medium storing instructions executable by a processor of a computational device, which when executed cause the computational device to:
receive network resource information pertaining to a network;
generate, in response to the receipt of the network resource information, timeslot information pertaining to a network resource of the network based on the network resource information, wherein the timeslot information indicates a date and a time period in which the network resource is available for use by subscribers of an over-the-top (OTT) multicast service to deliver programs to end users, wherein the subscribers are program providers;
generate, in response to the generation of the timeslot information, cost information based on policies and the timeslot information;
publish, in response to the generation of the cost information, the timeslot information and the cost information to the subscribers;
determine, in response to the publication, whether one of the subscribers has secured the network resource available during the date and the time period;
obtain, in response to a determination that the one of the subscribers has secured the network resource, program information that includes a uniform resource identifier of one of the programs that is to be delivered during the date and time period using the network resource; and
provision, in response to the obtainment, the network resource to deliver the one of the programs to at least one of the end users based on the program information and the timeslot information.

17. The non-transitory, computer-readable storage medium of claim 16, wherein the network resource of the network includes a pre-provisioned network resource or a dynamically-created network resource, and wherein the timeslot information indicates a geographic service area to which a timeslot is directed and a delivery parameter pertaining to a delivery of a candidate program.

18. The non-transitory, computer-readable storage medium of claim 17, wherein the instructions further include instructions executable by the processor of the computational device, which when executed cause the computational device to:
obtain trending data pertaining to the geographic service area, wherein the trending data indicates a measurement of a trend for a program source, and the instructions to generate the cost information, further comprise instructions to:
generate the cost information based on the policies, the timeslot information, and the trending data.

19. The non-transitory, computer-readable storage medium of claim 16, wherein the instructions further comprises instructions executable by the processor of the device, which when executed cause the computational device to:
receive, from an end device of the one of the subscribers, a request to log in to the OTT multicast service;
validate the request to log in based on subscription information of the one of the subscribers, and wherein the instructions to determine whether the one of the subscribers has secured the network resource, further include instructions executable by the processor of the computational device, which when executed cause the computational device to:
receive from the end device, a request indicating to secure the network resource.

20. The non-transitory, computer-readable storage medium of claim 16, wherein the instructions to provision further include instructions executable by the processor of the computational device, which when executed cause the computational device to:
spawn one or more virtualization entities in the network to deliver the program, wherein one or more locations at which the one or more virtualization entities are spawned are selected based on one or more geographic service areas associated with the timeslot information.

* * * * *